March 1, 1966
D. C. ROWE
3,238,289
MULTIPLE INFORMATION CONDUIT APPARATUS
Filed Dec. 1, 1961
2 Sheets-Sheet 1
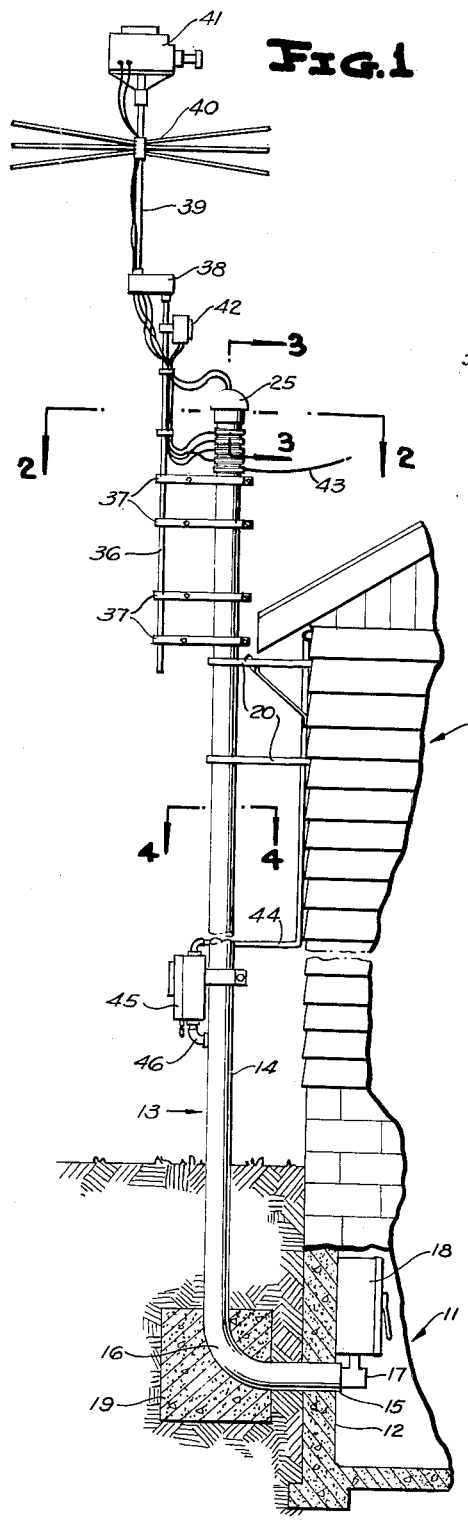
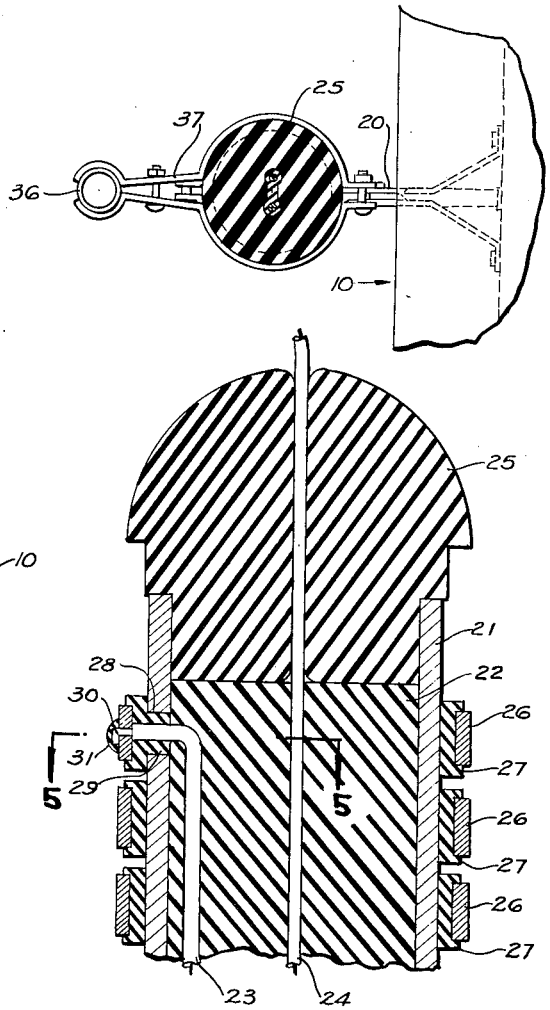
INVENTOR
DALE C. ROWE
BY Roy A. Plant
ATTORNEY March 1, 1966  D. C. ROWE  3,238,289
MULTIPLE INFORMATION CONDUIT APPARATUS
Filed Dec. 1, 1961  2 Sheets-Sheet 2

INVENTOR
DALE C. ROWE
BY Roy A. Plant
ATTORNEY

United States Patent Office 3,238,289
Patented Mar. 1, 1966

3,238,289
MULTIPLE INFORMATION CONDUIT APPARATUS
Dale C. Rowe, Rte. 5, Box 672, Battle Creek, Mich.
Filed Dec. 1, 1961, Ser. No. 156,219
9 Claims. (Cl. 174—72)

This invention relates in general to new and useful improvements in electrical conduits, and more particularly to a sealed multiple information conduit particularly intended for supplying information to a point of use such as an underground tornado, bomb, or nuclear fall-out shelter.

The public is becoming more and more conscious of the need for bomb shelters in view of the danger of nuclear fall-out radiation. Such bomb shelters would, of course, have to be placed sufficiently underground to withstand the pressures and heat of a moderately close hit, and at the same time protect from radiation. This raises the question as to how the comfort and knowledge of people in the shelters can be supplied while they remain in the shelter for several days until the radiation difficulties dissipate. The present invention is aimed at a solution to this problem.

When people are in a shelter, entertainment and information would be desirable in advance of any attack and after such an attack if facilities are still operating. These forms of entertainment would include television and radio, with the desire that there be led into the bomb shelter suitable antenna wires for a television and a radio, as well as an electrical supply line for supplying electricity, if still avaliable, to the bomb shelter. Other items of interest to people located within a bomb shelter would be the outside temperature, barometric pressure, wind direction and wind velocity, and, of course, the radioactivity count. In addition, it would be highly desirable, where possible, to provide a shelter with a closed circuit television so that the occupants of a shelter could view the surrounding area outside of the shelter while remaining within the shelter. It was a recognition of these problems, needs, and difficulties which led to the conception and development of the present invention.

Considering the foregoing, and since it is clear that a bomb shelter buried under two or three feet of dirt will require special means for transmitting outside information thereinto, it is the primary object of this invention to provide a conduit for electrical conductors, which electrical conduit is sealed so as to prevent the transmittal of radiation into the interior of the shelter.

Another object of this invention is to provide a novel conduit for electrical conductors which may lead into a bomb shelter, the conduit including a rigid casing of metal or other suitable material which, in itself, will provide adequate support for various instruments and antenna desired in connection with a bomb shelter.

Still another object of this invention is to provide a novel electrical conduit for use in conjunction with a bomb shelter, the conduit having inner and outer casings with conductors disposed between the casings, and the inner casing defining an air duct for removing stale air or supplying fresh air into the bomb shelter.

A further object of this invention is to provide a novel electrical conduit particularly designed for use in conjunction with bomb shelters and like underground shelters, the conduit including three concentric casings, the outer two casings having electrical conductors disposed therebetween in sealed relation, the space between inner casing and the intermediate casing defining a return duct, and the inner casing itself defining an intake duct, whereby fresh air may be circulated into the bomb shelter and exhaust air delivered therefrom through the same conduit assembly utilized for supplying electrical energy and information transmitted by way of electrical conductors to the bomb shelter.

A still further object of this invention is to provide a novel conduit for electrical conductors, the conduit being provided at the upper end thereof with a plurality of conductor elements insulated from the casing of the conduit, and conductors sealed within the conduit casing passing therethrough in insulated relation and being connected to the conductor elements, the conductor elements further having fittings for attaching external conductors thereto.

A further object of this invention is to provide a novel electrical conduit for supplying electrical energy and information through electrical conductors to underground structures, the conduit including a rigid metal casing having an elbow at the lower end thereof, and the elbow being encased in a supporting medium, such as a concrete block, to rigidly support the conduit against any movement relative to the underground structure.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a fragmentary elevational view with parts broken away and shown in section of a house having a shelter therebeneath, and the shelter being provided with a conduit in accordance with this invention, the conduit supporting various types of instruments.

FIGURE 2 is an enlarged fragmentary horizontal sectional view, as taken along the line 2—2 of FIGURE 1, looking in the direction of the arrows, and shows the specific mounting of the upper part of the conduit and the manner in which an auxiliary support is carried by the conduit.

FIGURE 3 is an enlarged fragmentary vertical sectional view taken along the line 3—3 of FIGURE 1, looking in the direction of the arrows, and shows the specific details of construction of one form of the upper portion of the conduit.

Figure 4:
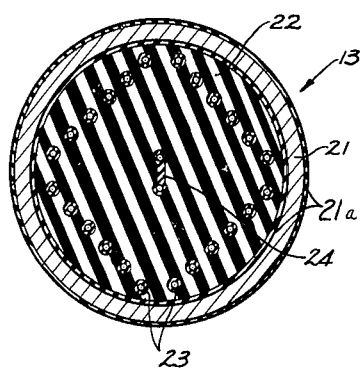
FIGURE 4 is an enlarged fragmentary horizontal sectional view taken along the line 4—4 of FIGURE 1, and shows the specific cross-section of one form of the conduit and the arrangement of conductors within the casing.

Referring now to the drawings in detail, it will be seen that there is illustrated in FIGURE 1 a conventional type of building 10 having an underground bomb shelter 11 therebeneath. The bomb shelter 11 includes an upright wall 12 which is disposed beneath the ground. In accordance with this invention, a conduit, generally referred to by the numeral 13, is provided for supplying electrical energy and information to the interior of the bomb shelter 11. The conduit 13 includes an elongated upright portion 14, a reltaively short horizontal portion 15, and an elbow 16 connecting together the portions 14 and 15. The horizontal portion 15 extends through the wall 12 of the bomb shelter 11 and has a fitting 17 connected on the end thereof within the bomb shelter 11. The fitting 17 is in turn connected to a suitable junction box 18 from which conductors may lead to suitable instruments (not shown).

In order to firmly anchor the conduit 13 relative to the bomb shelter 11, a large block of concrete 19 is cast adjacent the wall 12 of the bomb shelter, with the elbow 16 embedded therein. It is to be understood that the block of concrete 19 will be of a sufficient size to firmly anchor the lower part of the conduit 13 and, if the bomb shelter 11 is isolated instead of being associated with the building 10, will provide suitable support for the upright portion 14 of the conduit 13. However, when the bomb shelter 11 is associated with a building, such as the building 10, the upright portion 14 of the conduit 13 may be braced by means of suitable support brackets 20.

Reference is now made to FIGURE 4 in particular wherein certain of the structural details of the conduit 13 are shown. The conduit 13 includes a heavy metal casing 21 which is filled with a suitable sealing material 22. The sealing material 22 may be of any desired type, although it is preferred that it will have electrical insulating qualities. Also, it is preferred that the metal casing 21 have inner and outer coatings of fiber glass or suitable protective materials 21a. A plurality of conductors 23, which are preferably provided with an electrical insulating covering, are embedded within the sealing material 22 and maintained in any suitable relatively spaced parallel relation. The preferred arrangement of the conductors 23 is of a rectangular pattern, as is shown in FIGURE 4.

In addition to the conductors 23, the conduit 13 has disposed therein a twin lead conductor 24 of the type used for a television antenna cable. The twin lead conductor 24 is preferably twisted and centrally located within the casing 21.

Reference is now made to FIGURE 3 in particular wherein it will be seen that the upper end of the casing 21 is closed by means of a cap 25. The cap 25 has a lower portion telescoped within the upper end of the casing 21 and abuts against the upper end of a sealing material 22. The twin lead conductor 24 may extend through the center of the cap 25 and pass out through the upper end thereof to a TV antennae 40, FIGURE 1, or other information supply instrumentality.

The upper portion of the casing 21, FIGURE 3, below the cap 25 carries a plurality of ring-like conductor elements 26, each of which preferably extends entirely around the casing 21, for convenience of making connections to same. Each conductor element 26 is partially embedded in a ring of insulation 27 which insulates the conductor element from the casing 21. The casing 21 has a bore 28 leading outwardly therethrough in alignment with the upper end of a respective one of the conductors 23. Each ring of insulation 27 has an extension or bushing portion 29 passing through the bore 28 associated therewith.

It is to be noted that each of the conductors 23 has an end portion which extends through its respective conductor element 26 and is bonded, for instance by soldering, to the exterior surface thereof. The end portion of each conductor 23, which end portion is referred to by the numeral 30, is preferably protected by being coated or encased with a suitable covering 31 which is preferably formed of plastic or other weather-proof insulating material.

Figure 5:
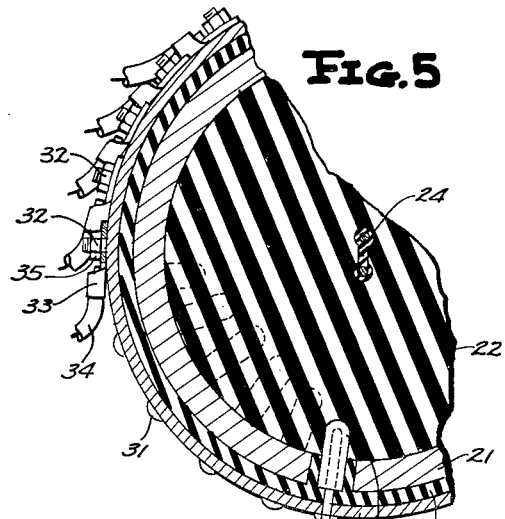
FIGURE 5 is an enlarged fragmentary horizontal sectional view taken along the line 5—5 of FIGURE 3, looking in the direction of the arrows, and shows the specific details of the mounting of a conductor element and the securing of conductors thereto.

Reference is now made to FIGURE 5 in particular wherein it is shown that each of the conductor elements 26 is provided with a fitting 32 to which a terminal 33 of an exterior conductor 34 may be secured by means of a nut 35. In this manner, external conductors may be readily attached to the conductors 23 within the conduit 13.

Referring once again to FIGURE 1, it will be seen that the upper portion of the conduit 13 supports an upstanding support 36. The support 36 is secured to the conduit 13 by any suitable means such as brackets 37. The support 36 projects above the upper end of the conduit 13 and is provided at the upper end thereof with an aerial motor 38 which in turn supports for rotation a further support 39. In the illustrated form of the invention, the support 39 carries a television antenna 40 and a closed circuit television camera 41. The aerial motor 38, the antenna 40 and the television camera 41 are provided with suitable leads or conductors which lead into the conduit 13.

In addition to the foregoing, the support 36 is illustrated as carrying a geiger counter or radiation meter 42. The support 36 may carry various other types of pickup heads (not shown), these including a pickup head for barometric pressure gage, a temperature gauge, a wind speed gauge and a wind direction gauge. In addition to these, there may be other suitable gauges which may be desired and which may be readily adapted to be mounted on the support 36.

The conduit 13, FIGURE 1, is also provided with a telephone lead-in wire 43. The conduit 13 is further provided with an electrical power cable 44. This power cable 44 passes into the usual meter box 45 which is suitably mounted on the conduit 13 and has a lead 46 which extends into the conduit 13 through an intermediate portion of the casing 21. It is to be understood that the shelter 11 will be provided with various dials and fittings to utilize all of the aforementioned components wherein information and power may be supplied to the interior of the shelter 11.

Figure 6:
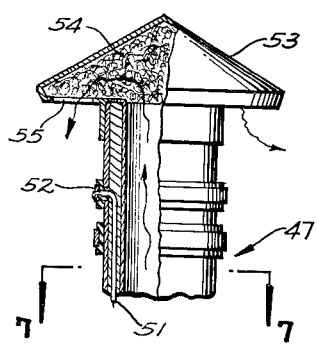
FIGURE 6 is an enlarged fragmentary elevational view with parts broken away and shown in section of an upper portion of a slightly modified form of conduit which may be used as an air exhaust, or intake, and shows the details thereof.
Figure 7:
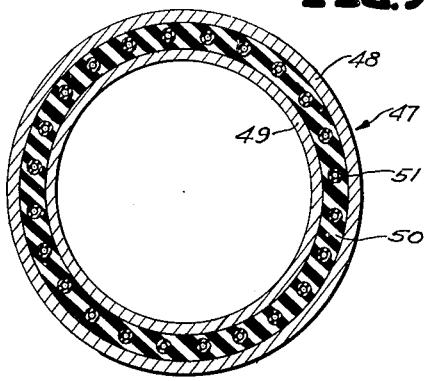
FIGURE 7 is an enlarged fragmentary horizontal sectional view taken along the line 7—7 of FIGURE 6, looking in the direction of the arrows, and shows further the details of the conduit of FIGURE 6.

Reference is now made to FIGURES 6 and 7, wherein there is illustrated a modified form of conduit generally referred to by the numeral 47. The conduit 47, like the conduit 13, includes a casing 48. However, in addition to the casing 48, the conduit 47 also includes an inner casing 49 which is disposed concentric to the casing 48. The casings 48 and 49 define a space filled with a suitable sealing and insulating compound 50. The conductors 51 carried by the conduit 47 are mounted in the sealing compound 50 between the casings 48 and 49.

The upper portion of the casing 48, FIGURE 6, is provided with a plurality of conductor elements 52 which are mounted in conventional insulated relation thereto in substantially the same manner as are the conductor elements 26, FIGURE 3. The conductors 51 will be connected to the conductor element 52 in the same manner as that described above with respect to the conduit 13. Also, it is to be understood that the conduit 47 may be self-supporting or may be secured to a building in the manner disclosed with respect to the conduit 13. Further, the conduit 47 may carry a support on which various pickup heads and antennas may be mounted in the manner described with respect to the conduit 13.

The casing 49, FIGURES 6 and 7, remains open entirely throughout into the shelter 11. As a result, the casing 49 can function as an air vent for either the downward flow of air into the shelter or for the exhausting of air from the shelter. In order to prevent direct access of dust, rain, or the like into the interior of the casing 49, the upper end of the conduit 47 is provided with a cap 53 which is conventionally secured to the casing 48. The cap 53 is preferably provided with a suitable filter material 54 and has air openings 55 in the underside thereof. It will be thus apparent that any air entering into the shelter through the conduit 47 will be filtered so as to remove undesired foreign matter.

Figure 8:
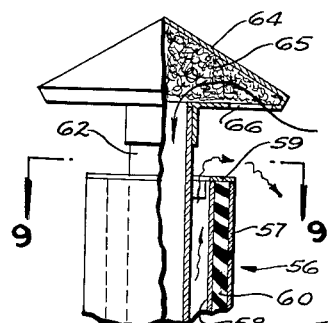
FIGURE 8 is an enlarged fragmentary elevational view of a further form of conduit, with parts being broken away and shown in section.
Figure 9:
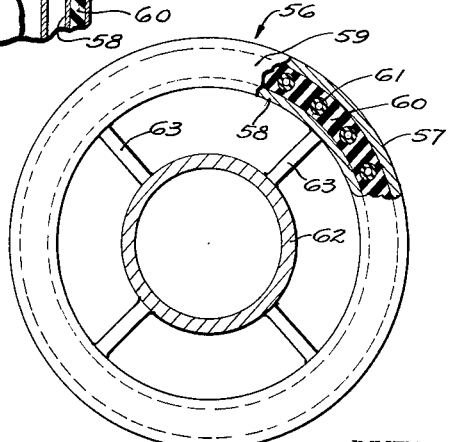
FIGURE 9 is an enlarged fragmentary horizontal sectional view taken along the line 9—9 of FIGURE 8, looking in the direction of the arrows, with portions broken away and shown in section of the form of conduit of FIGURE 8.

Reference is now made to FIGURES 8 and 9 wherein there is illustrated another form of the conduit, generally referred to by the numeral 56. The conduit 56, like the conduit 47, includes an outer casing 57 and an inner casing 58. The upper ends of the casings 57 and 58 are closed by a ring-like plate 59 and the space between the casings 57 and 58 will be filled with a sealing and insulating material 60 in which conductors 61 of the conduit 56 are embedded. The upper portion of the conduit 56 will be provided with the usual conductor elements (not shown) described with respect to the conduits 13 and 47, and the conductors 61 will be conventionally electrically connected thereto.

The conduit 56 also includes a third casing 62 which is disposed in concentric relation to the casings 57 and 58 and is maintained in this relation by a plurality of vertically spaced spokes 63. The spokes 63 radiate between the casings 62 and 58, and, if desired, may be in the form of ribs which extend the full height of the conduit 56.

It is to be noted that the casing 62, FIGURE 8, projects above the upper ends of the casings 57 and 58. The casing 62 defines an air intake duct, and the upper end thereof is closed by a cap 64 which corresponds to the cap 53. The cap 64 is secured to the casing 62 and the interior thereof is filled with a suitable filter material 65. The underside of the cap 64 is provided with suitable entrance openings 66 for the reception of air into the cap 64 with the air having to pass through the filter material 65.

It is to be noted that the cap 64 is of a sufficient diameter to well overlie the casing 56 and protect same from the direct entrance of foreign matter into the space between the casings 58 and 62. This space defines an exhaust duct through which air may be exhausted from a shelter to which the conduit 56 is attached. At this time, it is pointed out that since the exhaust duct is disposed outermost, during hot weather, the effect of the heat on the outer duct will be to heat the air therein and effect the upward thermal flow of the exhaust air, thus providing for the natural ventilation of the shelter to which the conduit 56 is attached.

The various connections for the conduit 56 have not been illustrated. However, it is to be understood that the conduit 56 may either be self-supporting or may be attached to a building in the manner described with respect to the conduit 13. In addition, the conduit 56 will support various types of pickup heads, aerials, et cetera, as may be required, and in like manner to that described in connection with conduit 13.

From the foregoing, it will be apparent that there has been devised several useful forms of conduits which may be utilized to provide an underground shelter with the necessary information required for the general welfare of people staying therein. The conduits are self-supporting and unless directly affected by high winds during a bombing, will be self-supporting and will remain upright and functional to continue to supply the necessary information to the interior of the shelter after bombing. In addition, the conduits are particularly designed to provide for the ventilation of a shelter against the danger of radiation.

Although several forms of conduits have been illustrated and described herein, it is to be understood that the invention is not limited to the specific conduit constructions disclosed, but that minor variations may be made in the conduit construction within the spirit and scope of the invention, as herein illustrated and described.

Other modes of applying the principle of my invention may be employed instead of those explained, change being made as regards the lead-in conduit and combinations herein disclosed, provided the means stated by any of the following claims or the equivalent of such stated means be employed.

I therefore particularly point out and distinctly claim as my invention:

1. A non-enclosed permanently positioned lead-in conduit for various uses, such as with underground shelters, comprising, in combination a stationary tubular casing of conductive material, a plurality of spaced insulation rings carried by the upper end portion of said casing, at least one electrical conductor element mounted on each of said insulation rings, spaced electrical conductors within said casing and having lower ends projecting out of the lower end of said casing, electrical insulation means insulating said spaced electrical conductors, and means connecting the upper end of each of said spaced conductors which are within said tubular casing to a corresponding one of said conductor elements mounted on said insulation rings, of said casing includes an elbow, and a permanent ground-supported means independent of said shelter supporting said elbow and anchoring said casing against movement relative to the ground.

2. A non-enclosed permanently positioned lead-in conduit for various uses, such as with underground shelters, comprising, in combination a stationary tubular casing of conductive material, a plurality of spaced insulation rings carried by the upper end portion of said casing, at least one electrical conductor element mounted on each of said insulation rings, spaced electrical conductors within said casing and having lower ends projecting out of the lower end of said casing, electrical insulation means insulating said spaced electrical conductors, and means connecting the upper end of each of said spaced conductors which are within said tubular casing to a corresponding one of said conductor elements mounted on said insulation rings, together with a second casing disposed within said first mentioned casing in concentric relation and forming an air duct, and said conductors being disposed between said casings.

3. A non-enclosed permanently positioned lead-in conduit for various uses, such as with underground shelters, comprising, in combination a stationary tubular casing of conductive material, a plurality of spaced insulation rings carried by the upper end portion of said casing, at least one electrical conductor element mounted on each of said insulation rings, spaced electrical conductors within said casing and having lower ends projecting out of the lower end of said casing, electrical insulation means insulating said spaced electrical conductors, and means connecting the upper end of each of said spaced conductors which are within said tubular casing to a corresponding one of said conductor elements mounted on said insulation rings, together with a second casing disposed within said first mentioned casing in concentric relation and forming an air duct, and said conductors being disposed between said casings, a cap on the upper end of said conduit and preventing direct access into said second casing, and an air filter disposed within said cap.

4. A non-enclosed permanently positioned lead-in conduit for various uses, such as with underground shelters, comprising a stationary tubular casing, a plurality of spaced conductors within said casing and having lower ends projecting out of said casing, a plurality of conductor elements carried by the upper end portion of said casing on the exterior thereof, insulation means electrically insulating said conductor elements from each other and said casing, an upper end of each conductor secured to one of said conductor elements, a second casing disposed within said first mentioned casing in concentric relation and forming an air duct, said conductors being disposed between said casings, and a third casing disposed within said second casing in concentric relation thereto and forming a second air duct, one of said ducts being an intake duct and the other an exhaust duct.

5. The conduit of claim 4 wherein said exhaust duct is disposed outwardly of said intake duct so that the elevated temperature during a warm day will promote natural circulation of air through said ducts.

6. The conduit of claim 4 wherein a cap is positioned on the upper end of said conduit and prevents direct access down into said air ducts and has a filter therein for at least air passing into said intake duct.

7. The conduit of claim 4 wherein a cap is positioned on the upper end of said conduit and prevents direct access down into said air ducts and has a filter therein for at least air passing into said intake duct, said third casing projecting above said first and second casings and supporting said cap.

8. A non-enclosed permanently positioned lead-in conduit for various uses, such as with underground shelters, comprising, in combination a stationary tubular casing of conductive material, a plurality of spaced insulation rings carried by the upper end portion of said casing, at least one electrical conductor element mounted on each of said insulation rings, spaced electrical conductors within said casing and having lower ends projecting out of the lower end of said casing, electrical insulation means insulating said spaced electrical conductors, and means connecting the upper end of each of said spaced conductors which are within said tubular casing to a corresponding one of said conductor elements mounted on said insulation rings, together with a stationary support, means mounting said stationary support on said tubular casing, an information gathering means rotatably mounted to said stationary support, and electrical lead lines connecting said information gathering means and said conductor elements.

9. The lead-in conduit of claim 4 including a stationary support, means mounting said stationary support on said tubular casing, an information gathering means rotatably mounted to said stationary support, and electrical lead lines connecting said information gathering means and said conductor elements.

References Cited by the Examiner

UNITED STATES PATENTS

| | | | |
|---|---|---|---|
| 1,847,272 | 3/1932 | Schwendt et al. | 174—16 |
| 2,232,360 | 2/1941 | Barnett | 147—47 X |
| 2,296,984 | 9/1942 | Corbetta | 50—100 X |
| 2,525,086 | 10/1950 | Wright et al. | 174—47 X |
| 2,682,609 | 6/1954 | Wampler | 174—70 X |
| 2,871,802 | 2/1959 | Fishler | 50—100 X |
| 2,910,524 | 10/1959 | Schaffhauser | 174—47 X |
| 2,912,625 | 11/1959 | Benson | 339—198 X |
| 3,059,202 | 2/1960 | Huber | 339—5 |
| 3,118,148 | 1/1964 | Taylor et al. | 50—100 |

FOREIGN PATENTS

| | | |
|---|---|---|
| 193,960 | 12/1957 | Austria. |
| 75,590 | 9/1946 | Czechoslovakia. |

JOHN F. BURNS, *Primary Examiner.*

JOHN P. WILDMAN, DARRELL L. CLAY, *Examiners.*